(12) United States Patent
Fujii

(10) Patent No.: US 11,996,624 B2
(45) Date of Patent: May 28, 2024

(54) ANTENNA SYSTEM AND RADIO RELAY APPARATUS

(71) Applicant: SoftBank Corp., Tokyo (JP)

(72) Inventor: Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/033,579

(22) PCT Filed: Oct. 6, 2021

(86) PCT No.: PCT/JP2021/037034
§ 371 (c)(1),
(2) Date: Apr. 25, 2023

(87) PCT Pub. No.: WO2022/091729
PCT Pub. Date: May 5, 2022

(65) Prior Publication Data
US 2024/0030595 A1    Jan. 25, 2024

(30) Foreign Application Priority Data
Oct. 26, 2020 (JP) .................. 2020-179239

(51) Int. Cl.
*H01Q 1/28* (2006.01)
*H01Q 1/20* (2006.01)
*H01Q 3/02* (2006.01)

(52) U.S. Cl.
CPC .............. *H01Q 3/02* (2013.01); *H01Q 1/20* (2013.01); *H01Q 1/28* (2013.01)

(58) Field of Classification Search
CPC ..... H01Q 1/20; H01Q 1/28; H01Q 3/02; H04B 7/185; H04W 16/28
See application file for complete search history.

(56) References Cited

U.S. PATENT DOCUMENTS

| 7,336,242 B2 * | 2/2008 | Phelan ............... H01Q 3/02 343/882 |
| 7,508,342 B2 * | 3/2009 | Nelson ............... H01Q 1/125 342/359 |
| 10,707,572 B2 * | 7/2020 | Ni .................... H01Q 1/28 |
| 11,601,823 B2 * | 3/2023 | Suzaki ............... H04B 7/0617 |

(Continued)

FOREIGN PATENT DOCUMENTS

| JP | 59-99511 | 7/1984 |
| JP | 64-23106 | 2/1989 |

(Continued)

OTHER PUBLICATIONS

Hiroto Kaneko, Balloon as a mobile repeater: Softbank, behind the scenes of development. Don't stop radio waves: Disaster countermeasures for 3 mobile companies (bottom), Mar. 11, 2023.

*Primary Examiner* — Tho G Phan
(74) *Attorney, Agent, or Firm* — Muirhead and Saturnelli, LLC

(57) ABSTRACT

In a drone-type radio relay apparatus, it is provided of an antenna system capable of suppressing an inclination of an antenna due to a strong wind during a stationary flight (hovering). The antenna system is provided with a long-shaped antenna 110 connected to a relay station via a cable, and an antenna guide mechanism that is fixed to a body of a drone and guides the antenna so as to be movable in an up-down direction of a basic attitude of the drone.

18 Claims, 8 Drawing Sheets

(56) References Cited

U.S. PATENT DOCUMENTS 11,641,234 B2 * 5/2023 Hirai .................... H04B 7/2041
                                                    455/12.1
11,757,525 B2 * 9/2023 Suzaki ............... H04B 7/18508
                                                    455/431

FOREIGN PATENT DOCUMENTS

JP          10-313206        11/1998
WO      WO 2018/163991 A1    9/2018

* cited by examiner

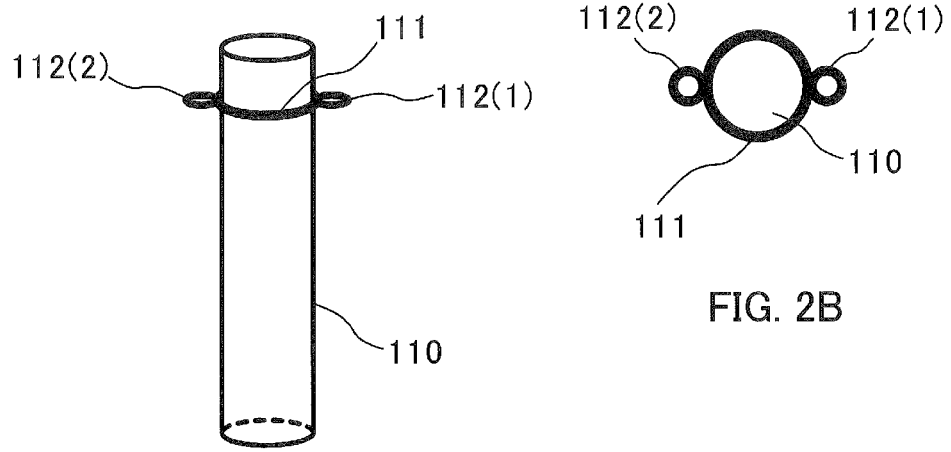
FIG. 2A
FIG. 2B
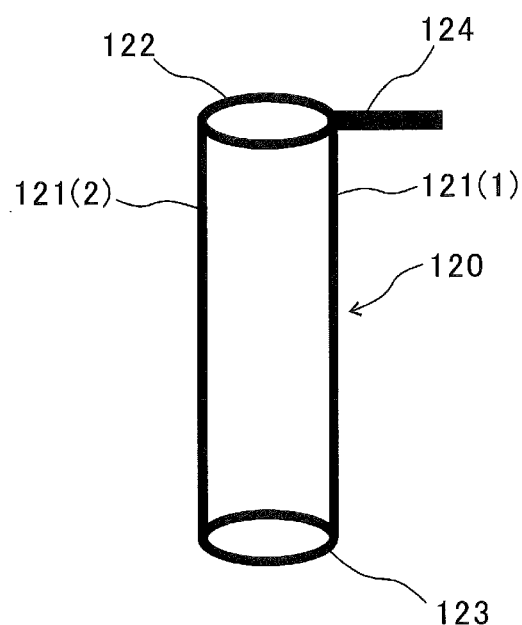
FIG. 2C

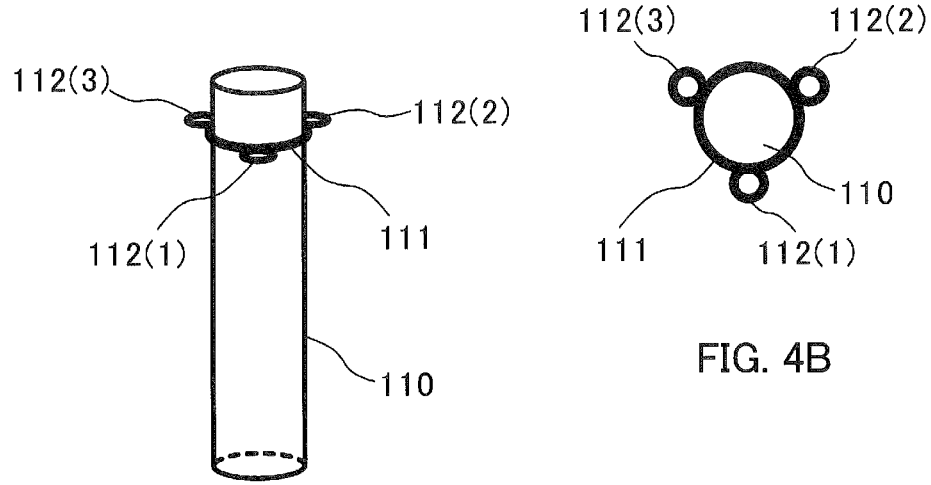
FIG. 4A
FIG. 4B
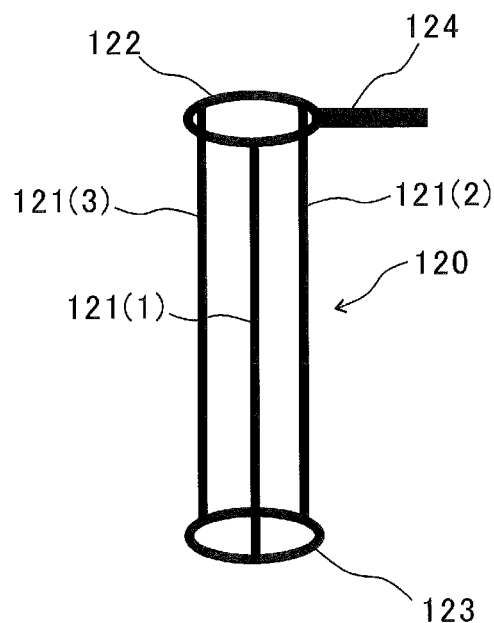
FIG. 4C

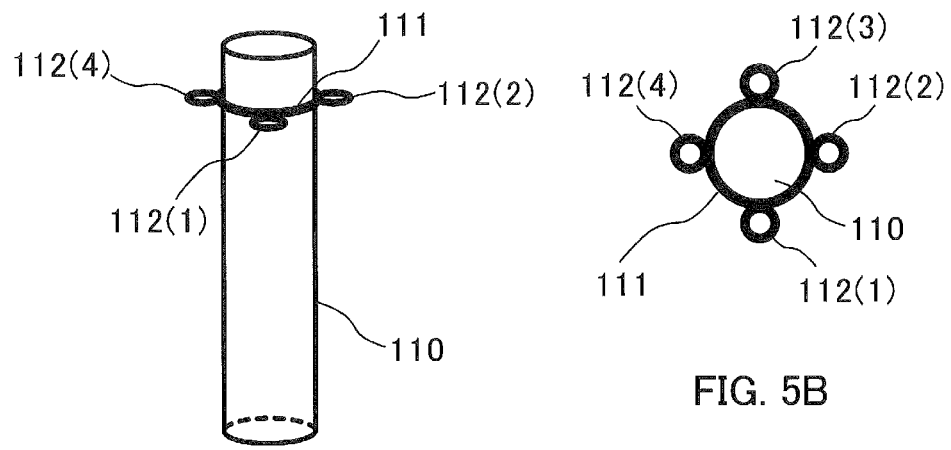
FIG. 5A
FIG. 5B
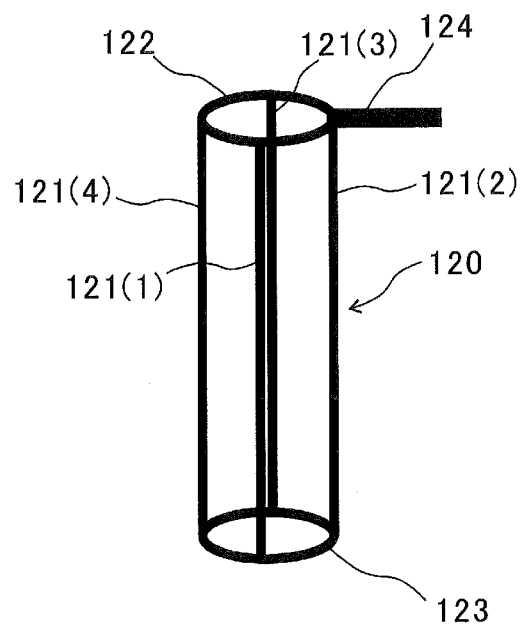
FIG. 5C

ANTENNA SYSTEM AND RADIO RELAY APPARATUS

TECHNICAL FIELD

The present invention relates to an antenna system and a radio relay apparatus having an antenna of a relay station.

BACKGROUND ART

There is conventionally known a radio relay apparatus in which a relay station is provided in a moored balloon that is moored so as to be located in an upper airspace or a drone capable of performing a stationary flight (hovering) in an upper airspace, and the relay station has an antenna for radio communication with the terrestrial side.

For example, in Non-Patent Literature 1, a moored-balloon type radio relay apparatus is disclosed, in which a spiral spring is externally mounted on a cable that connects a relay station provided on a moored balloon and an end of a long-shaped antenna.

CITATION LIST

Non-Patent Literature

Non-Patent Literature 1: Hiroto Kaneko, "Balloons as relay stations for mobile phones Softbank, Behind the scenes of development, Don't turn off radio waves Disaster countermeasures of three mobile companies (Part 2)", [on-line], Mar. 11, 2013, Nihon Keizai Shimbun electronic version, [Searched on Oct. 15, 2020], Internet <URL: https://www.nikkei.com/article/DGXBZO52650670Q3A310C1000000/>

SUMMARY OF INVENTION

Technical Problem

In a drone-type radio relay apparatus, it is necessary to maintain a basic attitude of an antenna, in which a longitudinal direction of the antenna is parallel to the vertical direction during the drone is in a stationary flight (hovering). However, there is a problem that the basic attitude of the antenna cannot be maintained because the spring exterior part of the cable bends and the antenna tilts under a strong wind.

Solution to Problem

An antenna system according to an aspect of the present invention is an antenna system for radio communication by a relay station in a drone-type radio relay apparatus. This antenna system comprises a long-shaped antenna connected to the relay station via a cable, and an antenna guide mechanism that is fixed to a body of a drone and guides the antenna so as to be movable in an up-down direction of a basic attitude of the drone.

In the foregoing antenna system, the antenna guide mechanism may guide the antenna in a movable manner, such that the antenna moves downward in the basic attitude of the drone by a weight of the antenna, and the antenna moves upward in the basic attitude of the drone by an upward force acting on the antenna.

In the foregoing antenna system, the antenna guide mechanism may have plural guide rails parallel to each other extending in the up-down direction of the basic attitude of the drone, and plural rail fixing members provided to connect and fix the plural guide rails at an upper-guide stop position and a lower-guide stop position that are separated from each other by a predetermined distance in the up-down direction of the plural guide rails, and the antenna may be attached with plural antenna fasteners through which the plural guide rails pass so as to be movable between the upper-guide stop position and the lower-guide stop position of the antenna guide mechanism.

In the foregoing antenna system, each of the plural antenna fasteners may be located on an upper portion of the antenna.

In the foregoing antenna system, the plural rail fixing members may have a circular ring shape, an elliptical ring shape, or a polygonal ring shape, and the plural guide rails and the plural rail fixing members may configure a circular-cylindrical, elliptical-cylindrical, or rectangular-cylindrical frame structure.

In the foregoing antenna system, the plural guide rails of the antenna guide mechanism may be two, three, or four guide rails located at two, three, or four locations different from each other around a central axis in a longitudinal direction of the antenna.

In the foregoing antenna system, the antenna may have a circular-cylindrical shape, an elliptical-cylindrical shape, or a prismatic shape.

A radio relay apparatus according to another aspect of the present invention is a drone-type radio relay apparatus, which comprises a relay station and any one of the foregoing antenna systems for radio communication by the relay station.

In the foregoing drone-type radio relay apparatus, a plurality of the foregoing antenna systems may be provided.

In the foregoing drone-type radio relay apparatus, the plurality of the antenna systems may include a first antenna system having a first antenna for radio communication with a relay-source radio apparatus and a second antenna system having a second antenna for radio communication with a relay-destination terminal apparatus.

BRIEF DESCRIPTION OF DRAWINGS

FIG. 2A is a perspective view showing an example of an antenna and an antenna fastener that configure an antenna system according to an embodiment.

FIG. 2B is a top view of the antenna and the antenna fastener that configure the antenna system.

FIG. 2C is a perspective view showing an example of an antenna guide mechanism consisting of a frame structure that configures the antenna system.

FIG. 4A is a perspective view showing another example of an antenna and an antenna fastener that configure an antenna system according to an embodiment.

FIG. 4B is a top view of the antenna and the antenna fastener that configure the antenna system.

FIG. 4C is a perspective view showing another example of an antenna guide mechanism that configures the antenna system.

FIG. 5A is a perspective view showing yet another example of an antenna and an antenna fastener that configure an antenna system according to an embodiment.

FIG. 5B is a top view of the antenna and the antenna fastener that configure the antenna system.

FIG. 5C is a perspective view showing yet another example of an antenna guide mechanism that configures the antenna system.

DESCRIPTION OF EMBODIMENTS

Hereinafter, embodiments of the present invention are described with reference to the drawings.

An apparatus provided with an antenna system according to embodiments described herein is a drone-type radio relay apparatus (hereinafter referred to as "drone-radio relay apparatus") that uses a lightweight and simple passive guide mechanism to move up and down an antenna for a master repeater (first antenna) and an antenna for a terminal (second antenna) of a relay station located in an upper airspace, and can prevent a damage to each antenna when landing and suppress an inclination of each antenna due to a strong wind during a stationary flight (hovering).

The drone-radio relay apparatus can perform a stationary flight (hovering) so as to be located in an upper airspace of a target area such as a disaster occurrence area of a typhoon, earthquake, etc. and a distress occurrence area of an avalanche, etc., and can function as a temporary or emergency repeater (slave repeater) or base station (eNodeB) that relays a communication between a communication network such as a mobile communication network and a terminal apparatus in the target area. As a result, for example, it is possible to quickly restore communications of mobile phones, smartphones, etc. at the disaster occurrence area, and support a search and rescue of a distressed person by relaying a communication of the distressed person's mobile phone, smartphone, etc. at the distress occurrence area.

Figure 1:
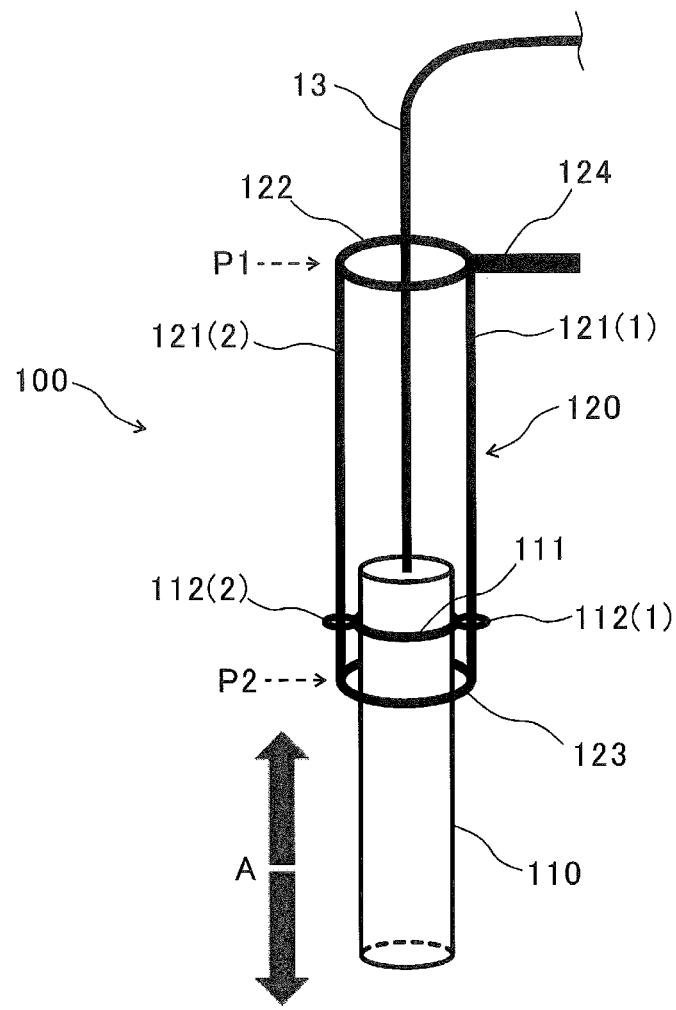
FIG. 1 is a perspective view showing an example of a schematic configuration of an antenna system in a drone-radio relay apparatus according to an embodiment.

FIG. 1 is a perspective view showing an example of a schematic configuration of an antenna system 100 in a drone-radio relay apparatus 10 according to an embodiment. FIG. 2A and FIG. 2B are respectively a perspective view and a top view showing an example of an antenna 110 and antenna fasteners 112(1) and 112(2) that configure the antenna system 100. FIG. 2C is a perspective view showing an example of an antenna guide mechanism 120 consisting of a frame structure that configures the antenna system 100.

The drone-radio relay apparatus 100 is an apparatus, in which a relay station is mounted on a drone that is an unmanned flying object capable of performing a stationary flight (hovering) while maintaining its basic attitude after moving to a predetermined position by a remote control from a control apparatus, etc. The basic attitude of the drone-radio relay apparatus 10 is an attitude when the drone-radio relay apparatus 10 is performing a stationary flight (hovering) or an attitude when it is landing on a flat ground.

The relay station relays a communication between a communication network such as a mobile communication network and a terminal apparatus (also called a user equipment (UE) or a mobile station). The relay station may be a slave repeater that wirelessly communicates with a master repeater (feeder station) on the ground side, or may be a base station connected to a mobile communication network via a backhaul line (feeder link) and a feeder station.

The antenna system 100 is an antenna system for radio communication by the relay station in the drone-radio relay apparatus 10. The antenna system 100 is provided with a long-shaped antenna 110 connected to the relay station via a cable 13, and an antenna guide mechanism 120 that is fixed to a body of a drone and guides the antenna 110 so as to be movable in an up-down direction of the basic attitude of the drone.

The antenna 110 is, for example, a linear array antenna for complying with a MIMO, which has plural antenna elements disposed in a longitudinal direction and has an omni-directionality in a virtual horizontal plane orthogonal to the longitudinal direction. The antenna 110 is shared for transmitting and receiving vertically polarized radio waves and for transmitting and receiving horizontally polarized radio waves.

The antenna guide mechanism 120 guides the antenna 110 in a movable manner, so that the antenna 110 moves downward in the basic attitude of the drone (downward direction of arrow A in the figure) by the weight of the antenna 110 itself, and the antenna 110 moves upward in the basic attitude of the drone by the upward force acting on the antenna 110 (upward direction of arrow A in the figure).

The antenna guide mechanism 120 has plural guide rails 121(1) and 121(2) parallel to each other extending in the up-down direction in the basic attitude of the drone body, and plural rail fixing members 122 and 123. The rail fixing members 122 and 123 are provided so as to connect and fix the plural guide rails 121(1) and 121(2) at an upper-guide stop position P1 and a lower-guide stop position P2 that are separated by a predetermined distance in the up-down direction of the plural guide rails 121(1) and 121(2).

The antenna 110 is attached with plural circular ring shaped (shape of the ring) antenna fasteners 112(1) and 112(2) through which the plural guide rails 121(1) and 121(2) pass so as to be movable between the upper-guide stop position P1 and the lower-guide stop position P2 of the antenna guide mechanism 120. The antenna fasteners 112(1) and 112(2) may have an arcuate shape with a notch in a part of a circular ring (ring), or have a rectangular ring shape other than a circle such as a triangle or a square.

The antenna fasteners 112(1) and 112(2) of the antenna 110 are attached to the upper part of the antenna 110 in the longitudinal direction. As a result, the antenna 110 can be moved downward as much as possible and exposed downward from the drone body frame during the drone flight, and it can be reduced of an interference between radio waves transmitted and received by the antenna 110 and the drone body frame (particularly, pedestal part). The antenna fasteners 112(1) and 112(2) of the antenna 110 are attached not at the upper end of antenna 110 in the longitudinal direction, but at a position slightly below the upper end. As a result, it is possible to enhance a function of holding the antenna 110 so that the longitudinal direction of the antenna 110 is in the up-down direction during the drone flight, and suppress an inclination of the antenna 110 with respect to the drone body when a strong lateral wind occurs during the flight.

The antenna fasteners 112(1) and 112(2) are respectively provided at two locations that are apart from each other on a circular-ring shaped mounting member 111 fixed to the outer peripheral surface of the antenna 110. The upward movements of the antenna fasteners 112(1) and 112(2) that move together with the antenna 110 are restricted by the rail fixing member 122 located at the upper-guide stop position P1. The downward movements of the antenna fasteners 112(1) and 112(2) are restricted by the rail fixing member 123 located at the lower-guide stop position P2.

The upper-guide stop position P1 and the lower-guide stop position P2, at which the rail fixing members 122 and 123 are respectively located, may be set based on the length of the antenna 110, the dimensions of the drone body frame (particularly, pedestal part), or the like. For example, the upper-guide stop position P1 is set so that the antenna fasteners 112(1) and 112(2) do not attach to the rail fixing member 122 when the drone lands. The lower-guide stop position P2 is set so that the antenna 110 is sufficiently exposed by a predetermined length below the drone body frame (particularly, pedestal part) during a flight with the antenna 110 being moved downward.

A fixing member 124 for fixing the antenna guide mechanism 120 to the drone body frame is provided on a side portion of the upper rail fixing member 122.

The guide rails 121(1) and 121(2) are formed with, for example, material such as lightweight metal material of aluminum or the like, carbon fiber or bamboo, which have a predetermined strength. The rail fixing members 122, 123 and the fixing member 124 are formed with, for example, material such as lightweight metal material of aluminum or the like, or carbon fiber, which have a predetermined strength. An exterior part (casing part), in which the antenna element of the antenna 110 is accommodated, is formed with, for example, a resin material. The antenna fasteners 112(1), 112(2) and their mounting member 111 are formed with, for example, material such as lightweight metal material of aluminum or the like, or carbon fiber, which have a predetermined strength.

Each of FIG. 3A, FIG. 3B, FIG. 3C, and FIG. 3D is a perspective view showing an example of the vertical position of the antenna before starting a takeoff operation, when starting a flight, during a flight, and during a landing operation of the drone-radio relay apparatus 10 according to an embodiment. Before starting the takeoff operation of the drone-radio relay apparatus 10 in FIG. 3A, the antenna 110 receives a force from the ground G, and it becomes a state in which the antenna 110 is moved upward while being guided by the antenna guide mechanism 120. Since the antenna 110 is held by the antenna guide mechanism 120, the antenna 110 is maintained in an upright state with its longitudinal direction parallel to the up-down direction (vertical direction) without falling on the ground G.

Figures 3A, 3B, 3C, 3D:
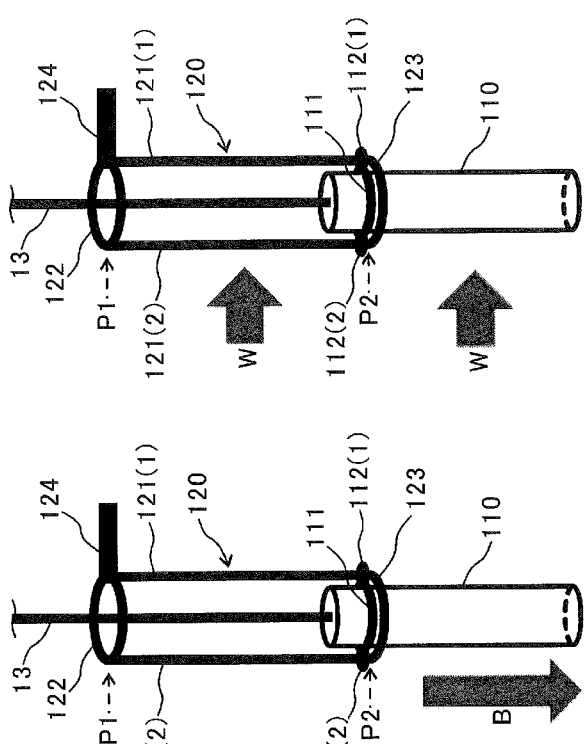
FIG. 3A is a perspective view showing an example of a vertical position of an antenna before starting a takeoff operation of a drone-radio relay apparatus according to an embodiment.
FIG. 3B is a perspective view showing an example of a vertical position of the antenna when starting a flight of the drone-radio relay apparatus.
FIG. 3C is a perspective view showing an example of a vertical position of the antenna during a flight of the drone-radio relay apparatus.
FIG. 3D is a perspective view showing an example of a vertical position of the antenna during a landing operation of the drone-radio relay apparatus.

At the time of start of flight of the drone-radio relay apparatus 10 in FIG. 3B, the antenna 110 gradually moves downward (direction B in the figure) due to its own weight while the antenna 110 is guided by the antenna guide mechanism 120.

During a stationary flight (hovering) of the drone-radio relay apparatus 10 in FIG. 3C, the antenna 110 moves to the lowest position due to its own weight, and it is maintained of a state in which the longitudinal direction of the antenna 110 is parallel to the up-down direction (vertical direction). This state is maintained autonomously even when a strong lateral wind W occurs.

During a landing operation of the drone-radio relay apparatus 10 in FIG. 3D, the lower end of the antenna 110 contacts the ground G, the antenna 110 receives an upward force F from the ground G, and the antenna 110 gradually moves upward while being guided by the antenna guide mechanism 120. This movement continues until the landing operation is completed, in which the lower end of the pedestal part of the drone body frame touches the ground G. After the landing is completed, the antenna 110 is held by the antenna guide mechanism 120 as shown in FIG. 3A described above, so that the antenna 110 is maintained in the upright state with its longitudinal direction parallel to the up-down direction (vertical direction) without falling on the ground G.

The configurations of the antenna fastener 112, the guide rail 121, and the rail fixing members 122 and 123 of the antenna system 100 according to the embodiment are not limited to the configurations in FIG. 1, FIG. 2A to FIG. 2C, and FIG. 3A to FIG. 3D.

For example, as shown in FIG. 4A to FIG. 4C, the number of sets of the antenna fastener 112 and the guide rail 121 of the antenna system 100 may be three, and the antenna 110 may be configured to be vertically movable while being guided at three points in the circumferential direction of the outer peripheral surface of the antenna 110. As shown in FIG. 5A to FIG. 5C, the number of sets of the antenna fastener 112 and the guide rail 121 of the antenna system 100 may be four, and the antenna 110 may be configured to be vertically movable while being guided at four points in the circumferential direction of the outer peripheral surface of the antenna 110. Further, the number of sets of the antenna fastener 112 and the guide rail 121 of the antenna system 100 may be five or more.

Figure 6A:
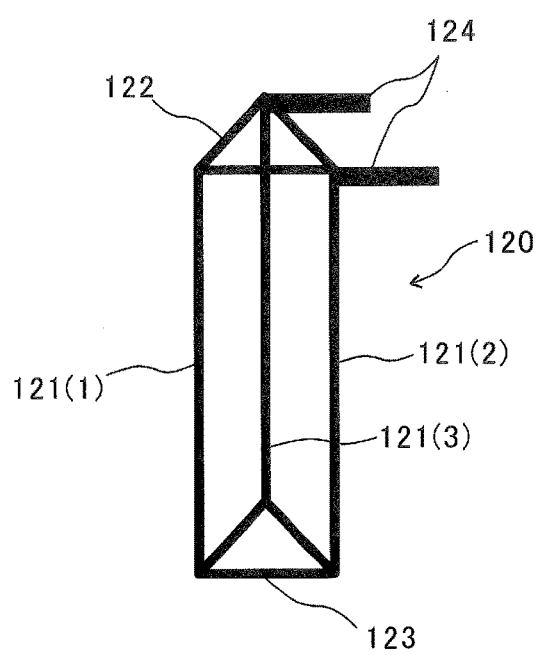
FIG. 6A is a perspective view showing yet another example of an antenna guide mechanism consisting of a frame structure that configure an antenna system according to an embodiment.
Figure 6B:
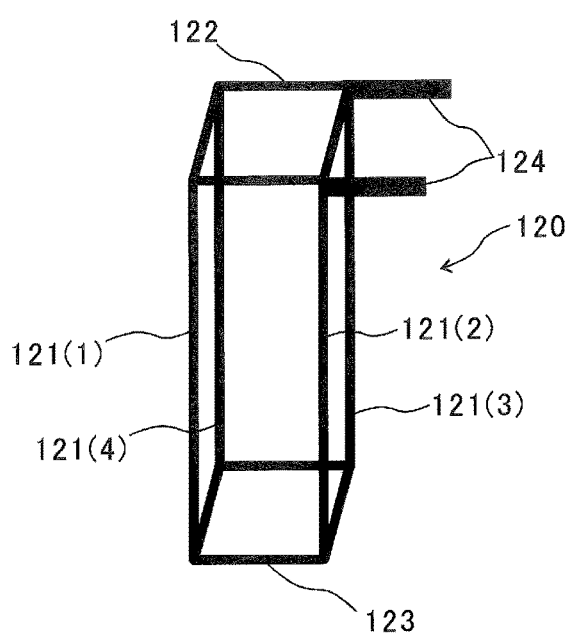
FIG. 6B is a perspective view showing yet another example of an antenna guide mechanism consisting of a frame structure that configures an antenna system according to an embodiment.

As shown in FIG. 6A, the plural rail fixing members 122 and 123 may have a triangular polygonal-ring shape, and the plural guide rails 121(1) to 121(3) and the plural rail fixing members 122 and 123 may configure the antenna guide mechanism 120 made up of a triangular rectangular-cylindrical frame structure. As shown in FIG. 6B, the plural rail fixing members 122 and 123 may have a square polygonal-ring shape, and the plural guide rails 121(1) to 121(4) and the plural rail fixing members 122 and 123 may configure the antenna guide mechanism 120 made up of a square rectangular-cylindrical frame structure. Further, the rail fixing members 122 and 123 may have a polygonal ring shape of pentagon or more, or may have an elliptical ring shape.

The antenna 110 may have an outer shape of an elliptical-cylindrical shape, or a prismatic shape of a triangular, square, or pentagonal or more polygonal shape, instead of the circular-cylindrical shape shown in FIG. 1, FIG. 2A to FIG. 2C, FIG. 3A to FIG. 3D, FIG. 4A to FIG. 4C and FIG. 5A to FIG. 5C. In case of using a triangular-prismatic antenna 110, it is suitable of the antenna guide mechanism 120 made up of a triangular rectangular-cylindrical frame structure shown in FIG. 6A. In the case of using a square prismatic antenna 110, it is suitable of the antenna guide mechanism 120 made of a square rectangular-cylindrical frame structure shown in FIG. 6B.

Figure 7A:
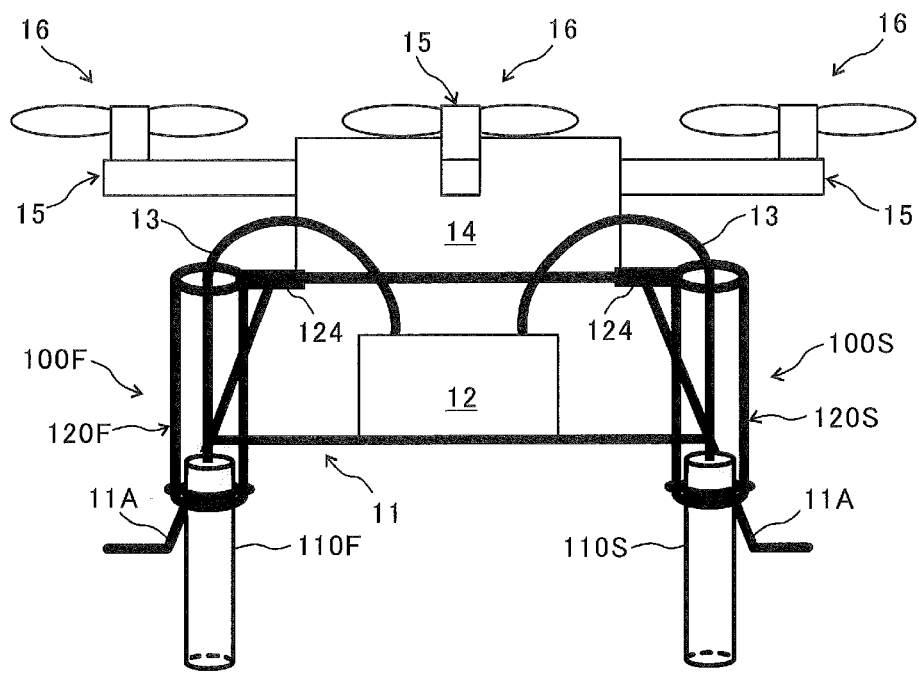
FIG. 7A is an illustration showing an example of attachment of an antenna system during a flight of a drone-radio relay apparatus according to an embodiment.
Figure 7B:
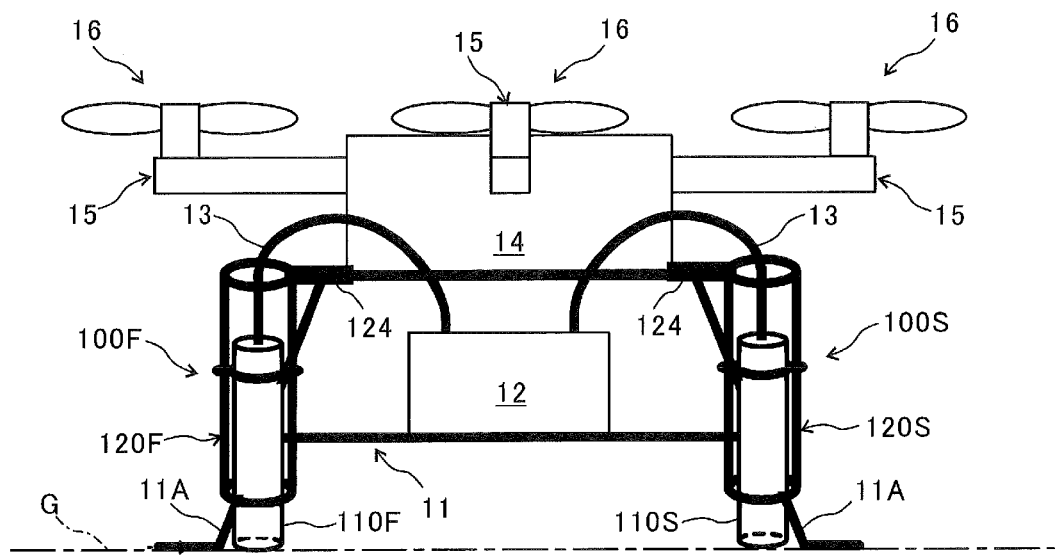
FIG. 7B is an illustration showing an example of attachment of the antenna system on landing of the drone-radio relay apparatus.

Each of FIG. 7A and FIG. 7B is an illustration showing an example of mounting the antenna system 100 during a flight and on landing of the drone-radio relay apparatus 10 according to an embodiment. In the present example, the drone-radio relay apparatus 10 is provided with a drone body frame 11 as a body of the drone, a relay station 12 provided in the center of the drone body frame 11, a drone-flight control apparatus 14 provided on the upper surface of the drone body frame 11, and plural motor-driven propellers 16 attached to the drone-flight control apparatus 14 via arm parts 15.

The drone body frame 11 has plural pedestal parts 11A that touch the ground G on landing. Plural antenna systems 100F and 100S are attached to the top surface edge of the drone body frame 11. The antenna systems 100F and 100S may be respectively fixed to the drone body frame 11 at two or more points.

The first antenna system 100F has a first antenna 110F for radio communication with a relay source radio apparatus (for example, a master repeater).

The second antenna system 100S has a second antenna 110S for radio communication with a relay destination terminal apparatus.

Each of the first antenna 110F and the second antenna 110S is connected to the relay station 12 via a deformable flexible cable 13 so as not to hinder the up-and-down movement of each of the first antenna 110F and the second antenna 110S.

The relay station 12 may have a function of a repeater (slave repeater) or a function of a base station (eNodeB). The drone-flight control apparatus 14 is provided with, for example, a communication section for receiving a flight control signal from the outside, a control section for controlling the rotational drive of each propeller 16 by a remote control or autonomous control, and a power supply section having a battery or the like.

During the flight after taking off from the ground in FIG. 7A, each of the first antenna 110F and the second antenna 110S can move downward due to its own weight so as not to receive an interference from the pedestal part 11A of the drone body frame 11 as much as possible. Since each of the first antenna 110F and the second antenna 110S is held by the antenna guide mechanisms 120F and 120S, even when it is subjected to a lateral strong wind, the inclination of each antenna is suppressed, and the basic attitude, in which the longitudinal direction of each antenna is parallel to the up-down direction (vertical direction), is maintained.

At the time of the landing on the ground G in FIG. 7B, each of the first antenna 110F and the second antenna 110S moves upward so as to be accommodated within the drone body frame 11 by receiving an upward force from the ground G. By this movement, the first antenna 110F and the second antenna 110S can be prevented from being damaged due to collision with the ground G at the time of the landing. Each of the first antenna 110F and the second antenna 110S is held by the antenna guide mechanisms 120F and 120S, so that the basic attitude, in which the longitudinal direction of each antenna is parallel to the up-down direction (vertical direction), is maintained, and each antenna does not fall down and touch the ground G.

Figure 8:
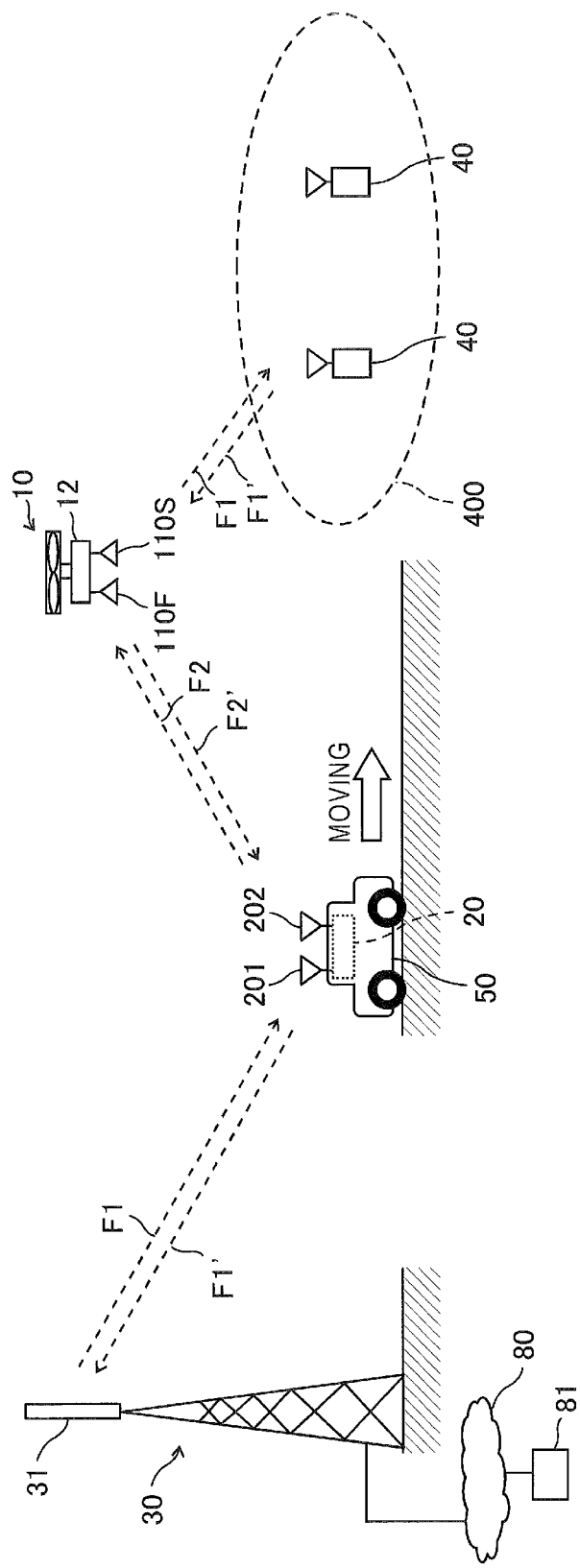
FIG. 8 is an illustration showing an example of a radio relay system and a communication system including a drone-radio relay apparatus according to an embodiment.

FIG. 8 is an illustration showing an example of a radio relay system and a communication system including the drone-radio relay apparatus 10 according to an embodiment.

In FIG. 8, the radio relay system according to the present embodiment is provide with a network-side relay station (hereinafter referred to as "master repeater") 20 as a first-radio relay station located on the ground, and a relay station (hereinafter referred to as "slave repeater") 12 as a second-radio relay station mounted on the drone-radio relay apparatus 10. The communication system according to the present embodiment includes the master repeater 20, the slave repeater (relay station) 12 mounted on the drone-radio relay apparatus 10, and plural mobile stations 40 as terminal apparatuses (user apparatuses) located in the target area 400.

The master repeater 20 and the slave repeater 12 simultaneously perform relay radio communications between plural fixed base stations 30 such as macro-cell base stations connected to each of the core networks of a mobile communication networks 80 of communication operators (communication carriers) and plural mobile stations 40 as terminal apparatuses (user apparatuses) corresponding to the communication operators.

The master repeater 20 is a frequency-conversion type radio relay apparatus for relaying radio signals of the relay-target first frequencies (relay target frequencies) F1 (downlink signal) and F1' (uplink signal) to and from the fixed base station 30 and radio signals of the second frequencies (intermediate frequencies) F2 (downlink signal) and F2' (uplink signal) to and from the slave repeater 12. The master repeater 20 has a first antenna 201 for the fixed base station 30 and a second antenna 202 for the slave repeater 12.

The drone-radio relay apparatus 10, on which the slave repeater 12 is mounted, is flight-controlled so as to stay in the upper airspace at a predetermined altitude (for example, 100 to 150 m) from the ground.

The slave repeater 12 is a frequency-conversion type radio relay apparatus for relaying radio signals of the second frequency (intermediate frequency) F2/F2' to and from the master repeater 20 and radio signals of the first frequency (relay target frequency) F1/F1' to and from the mobile station 40.

In each of the master repeater 20 and the slave repeater 12, the first frequency (relay target frequency) F1/F1' and the second frequency (intermediate frequency) F2/F2' are the frequencies different from each other so as not to occur a loop interference between the radio signals transmitted and received by the master repeater 20 and a loop interference between the radio signals transmitted and received by the slave repeater 12.

As described above, according to the present embodiment, in the drone-radio relay apparatus 10, it is possible to prevent the damage to the antenna 110 on landing, and to suppress the inclination of the antenna 110 due to the strong wind during a stationary flight (hovering).

REFERENCE SIGNS LIST

10: drone-radio relay apparatus (drone-type radio relay apparatus)
11: drone body frame
11A: pedestal part
12: relay station (slave repeater)
13: cable
14: drone-flight control apparatus
15: arm part
16: propeller
20: master repeater
30: fixed base station
40: terminal apparatus (mobile station)
80: mobile communication network
100: antenna system 100F: first antenna system
100S: second antenna system
110: antenna
110F: first antenna
110S: second antenna
111: mounting member
112: antenna fastener
120: antenna guide mechanism
120F: antenna guide mechanism
120S: antenna guide mechanism
121: guide rail
122: rail fixing member
123: rail fixing member
124: fixing member

The invention claimed is:

1. An antenna system for radio communication by a relay station in a drone-type radio relay apparatus, comprising:
   a long-shaped antenna connected to the relay station via a cable; and
   an antenna guide mechanism that is fixed to a body of a drone, and
   wherein the antenna guide mechanism does not expand and contract in an up-down direction of a basic attitude of the drone and moves the antenna in the up-down direction while supporting the antenna inside.

2. The antenna system according to claim 1,
   wherein the antenna guide mechanism guides the antenna in a movable manner, such that the antenna moves downward in the basic attitude of the drone by a weight of the antenna, and the antenna moves upward in the basic attitude of the drone by an upward force acting on the antenna.

3. The antenna system according to claim 2, wherein the antenna guide mechanism comprises:
   plural guide rails parallel to each other, the guide rails extending in the up-down direction of the basic attitude of the drone; and
   plural rail fixing members provided to connect and fix the plural guide rails at an upper-guide stop position and a lower-guide stop position that are separated from each other by a predetermined distance in the up-down direction of the plural guide rails, and
   wherein the antenna is attached with plural antenna fasteners through which the plural guide rails pass so as to be movable between the upper-guide stop position and the lower-guide stop position of the antenna guide mechanism.

4. The antenna system according to claim 3,
   wherein the plural rail fixing members have a circular ring shape, an elliptical ring shape, or a polygonal ring shape, and
   wherein the plural guide rails and the plural rail fixing members configure a circular-cylindrical, elliptical-cylindrical, or rectangular-cylindrical frame structure.

5. The antenna system according to claim 4,
   wherein the plural guide rails of the antenna guide mechanism are two, three, or four guide rails located at two, three, or four locations different from each other around a central axis in a longitudinal direction of the antenna.

6. The antenna system according to claim 3,
   wherein the plural guide rails of the antenna guide mechanism are two, three, or four guide rails located at two, three, or four locations different from each other around a central axis in a longitudinal direction of the antenna.

7. A drone-type radio relay apparatus comprising a relay station and an antenna system for radio communication by the relay station,
   wherein the antenna system is the antenna system according to claim 2.

8. The drone-type radio relay apparatus according to claim 7,
   wherein the antenna system includes a first antenna for radio communication with a relay-source radio apparatus and a different antenna system includes a second antenna for radio communication with a relay-destination terminal apparatus.

9. The antenna system according to claim 1, wherein the antenna guide mechanism comprises:
   plural guide rails parallel to each other, the guide rails extending in the up-down direction of the basic attitude of the drone; and
   plural rail fixing members provided to connect and fix the plural guide rails at an upper-guide stop position and a lower-guide stop position that are separated from each other by a predetermined distance in the up-down direction of the plural guide rails, and
   wherein the antenna is attached with plural antenna fasteners through which the plural guide rails pass so as to be movable between the upper-guide stop position and the lower-guide stop position of the antenna guide mechanism.

10. The antenna system according to claim 9,
    wherein the plural rail fixing members have a circular ring shape, an elliptical ring shape, or a polygonal ring shape, and
    wherein the plural guide rails and the plural rail fixing members configure a circular-cylindrical, elliptical-cylindrical, or rectangular-cylindrical frame structure.

11. The antenna system according to claim 10,
    wherein the plural guide rails of the antenna guide mechanism are two, three, or four guide rails located at two, three, or four locations different from each other around a central axis in a longitudinal direction of the antenna.

12. A drone-type radio relay apparatus comprising a relay station and an antenna system for radio communication by the relay station,
    wherein the antenna system is the antenna system according to claim 10.

13. The antenna system according to claim 9,
    wherein the plural guide rails of the antenna guide mechanism are two, three, or four guide rails located at two, three, or four locations different from each other around a central axis in a longitudinal direction of the antenna.

14. A drone-type radio relay apparatus comprising a relay station and an antenna system for radio communication by the relay station,
    wherein the antenna system is the antenna system according to claim 13.

15. A drone-type radio relay apparatus comprising a relay station and an antenna system for radio communication by the relay station,
    wherein the antenna system is the antenna system according to claim 9.

16. The drone-type radio relay apparatus according to claim 15,
    wherein the plural antenna systems include a first antenna system having a first antenna for radio communication with a relay-source radio apparatus and a second antenna system having a second antenna for radio communication with a relay-destination terminal apparatus.

17. A drone-type radio relay apparatus comprising a relay station and an antenna system for radio communication by the relay station, wherein the antenna system is the antenna system according to claim 1.

18. The drone-type radio relay apparatus according to claim 17,
wherein the antenna system includes a first antenna for radio communication with a relay-source radio apparatus and a different antenna system includes a second antenna for radio communication with a relay-destination terminal apparatus.

* * * * *